Patented Dec. 24, 1940

2,226,421

UNITED STATES PATENT OFFICE 2,226,421

BONE BLACK

Elliott P. Barrett and George D. Beal, Pittsburgh, Pa.

No Drawing. Application November 25, 1939, Serial No. 306,186

17 Claims. (Cl. 134—58)

This invention relates to bone black pigments of improved character.

It is among the objects of the invention to provide bone black pigments of improved mass tone, or jetness, and tinting strength, either or both, as well as to provide a simple, easily performed and inexpensive process of producing such bone black.

Another object is to provide bone black of substantially lower volatile content than is present in bone blacks produced commercially heretofore, and a method of producing such bone black which is applicable either to the production of bone black from raw bone or to reduction of the volatile content of bone black produced by processes used heretofore.

Still another object is to provide bone black pigments of controlled carbon and volatile contents according to the properties desired, and particularly of satisfactory jetness and unusually high tinting strength.

Yet another object is to provide a process of treating bone black to improve its tinctorial value, and especially to reduce the volatile content to that end.

Another object is to produce bone black having less than 2 per cent of volatile content.

Still other objects will be understood from the following description.

Ordinary bone black pigments as made prior to this invention have had a substantial proportion of volatile content. Examination of a large number of such blacks from various sources, both domestic and foreign, has shown the volatile content to range from 4 to about 8 per cent, and in no instance below 3 per cent. Likewise, their carbon content varies from about 8 to more than 15 per cent.

We have discovered, and it is upon this that our invention is predicated in large part, that by reducing the volatile content below about 3 per cent, and most suitably to less than about 2 per cent, the pigment properties of bone black, particularly as regards mass tone, or jetness, and tinting strength, are substantially, and surprisingly, improved as compared with the bone blacks made heretofore.

In accordance with the invention the material undergoing treatment, which may be either bone or bone black, is heated under conditions such as to expel, or to assist expulsion of, volatile content, the vaporized material is removed, and this treatment is continued until the volatile content of the resultant bone black has been reduced to the desired value. The heat treatment should be so conducted as to avoid any substantial polymerization of the volatile content of the material being treated because it is difficult to remove the polymers under conditions applicable to the economical production of a satisfactory product. To this end the vaporized matter should not be superheated before it has been expelled from the particles of bone or bone black, or while it is in contact therewith, and it should be removed promptly from contact with the material being treated, most suitably substantially as rapidly as it is liberated. The mode in which liberation of volatile content is assisted and the vaporized matter is removed may be varied, as will appear hereinafter, but it is essential to assist in removal of the volatile content, which is an important feature of the invention. Thus, simple heating as used heretofore does not suffice to reduce the volatile content, as exemplified by the bone black compositions given above, and more prolonged heating has no effect in this regard. Also, it is a strange fact that when bone black, e. g., spent sugar decolorizing bone black, is repeatedly reburned, its volatile content remains essentially unchanged despite progressive reduction of its carbon content. In the practice of the invention the material should be heated to at least about 950° C.

The term "volatile content" as used herein is to be differentiated from the more general terms "volatile matter" or "volatile" which are sometimes used to designate any vaporizable material driven out of bone in retorting it. As used herein, the term "volatile content" refers to the content of volatile material in bone black determined in accordance with a particular procedure, now to be described, which is applicable also to the determination of the carbon content as that term is used herein.

*Preparation of sample*

In this procedure the material is ground so that all of it will pass a 20-mesh screen. The sample is placed on a clean sheet of paper, oil-cloth, rubber, or the like large enough to permit mixing without loss of any of the sample. The material is formed into a cone which is slightly flattened with a spatula whose blade is broader than the height of the flattened cone. The cone is then halved by passing the spatula edgewise through a diameter of it, the two halves being separated by moving the spatula a distance of 1 to 2 inches in a direction perpendicular to the diameter through which it was passed. The sample is then quartered by passing the spatula through the halves along a diameter approximately at right angles to that used in the original halving, and again moving the spatula to separate the quarters. Either pair of diametrically opposite quarters are removed and discarded. The remaining pair are mixed and this quartering operation is repeated until there are obtained two quarters which contain a total of about 20 grams of sample. This 20-gram sample is then ground in a porcelain or agate mortar until it passes a 100-mesh screen. The ground sample is to be stored in a tightly stoppered bottle to prevent change in moisture content.

*Determination of moisture content*

A 5-gram portion of the sample prepared as just described is dried to constant weight in an oven at 105° C. The loss in weight calculated to per cent of initial weight represents the moisture content and is used to calculate other analytical results to the dry basis.

*Determination of carbon content*

A 2-gram portion of the sample is treated with a mixture of 40 cc. of concentrated (35 to 37 per cent) hydrochloric acid and 10 cc. of water by boiling in a beaker for fifteen minutes. The sides of the beaker are washed down with hot water, and the boiling is continued for ten minutes. The solution is then filtered through asbestos in a previously ignited and weighed perforated crucible, and the residue is washed with water until the filtrate is neutral to litmus. The crucible is dried in an oven at 105° C., cooled and weighed. It is then ignited at a dull red heat until ashing appears to be complete, then at 850° to 900° C., preferably in a furnace, to constant weight.

If A is the weight of the sample used, B the weight of the crucible and acid-insoluble residue after drying, C the weight of the crucible and incombustible residue after ignition, and D the weight of moisture in "A" grams of sample, then carbon content=

$$\frac{B-C}{A-D} \times 100$$

*Determination of volatile content*

A 1-gram portion of the ground sample, prepared as described above, is ignited in a crucible at dull red heat until ashing appears to be complete, then at 850° to 900° C., preferably in a furnace, to constant weight.

If E is the weight of the sample, F the weight of the crucible and the sample before ignition, G the weight of the crucible and residue after ignition, and H the weight of the moisture in "E" grams of sample, then volatile content=

$$\frac{(F-G)-H}{E-H} \times 100 - \text{the carbon content}$$

The tinctorial power, i. e., the jetness and tinting strength, of bone blacks as discussed herein also has reference to these properties as determined by particular procedures.

*Determination of jetness (mass tone)*

In the tests referred to herein the jetness was determined substantially in accordance with the A. S. T. M. specification identified as designation D387-36 for "Mass color." The mass tone of the samples was compared by looking through the glass side, not at its top as called for by the specification, because in the case of black pigments relatively small differences in oil absorption give the pastes different degrees of gloss which interferes with the observation of relative jetness. Observation through the glass eliminates this difficulty.

*Determination of tinting strength*

Tinting strengths as referred to herein were determined by a modification of the foregoing A. S. T. M. specification. In accordance with this modified procedure 0.200 gram of the bone black, previously ground to pass 325-mesh, is rubbed in 15 drops of linseed oil on a glass slab 50 times. The paste is then collected and rubbed again 50 times. Then add 35 drops of linseed oil and 2.000 grams of C. P. powdered zinc oxide. The material is then collected and mixed well with a spatula and rubbed 25 times. The collection of the paste and rubbing 25 times are repeated twice more. The material is then collected and placed on a slide as specified in the A. S. T. M. specification.

In making these two tests the qualities or grades of materials are the same as those set by the A. S. T. M. specification unless specific exception is mentioned. Also, in making the tests referred to herein there was used a muller with a 4-inch grinding face instead of one as designated in the A. S. T. M. specification.

Returning now to the practice of the invention, it is applicable, as noted above, both to the production of bone black pigment of improved character from bone, and particularly to improvement of bone black produced by other procedures, such as those which have been used commercially for making bone black. The principles of the invention enunciated above and now to be described in greater detail, apply to both although the treatment of each may differ in details which will appear hereinafter.

An important feature is the temperature to which the material is exposed. We have found that it should be heated to at least about 950° C., and that longer exposure to lower temperatures does not suffice to lower the volatile content, at least to the extent necessary to confer improved tinctorial power. The time during which the maximum temperature is maintained seems to be a factor of minor importance in effecting reduction of volatile content, the main thing to this end being to reach the temperature stated. Ashing should be avoided because it reduces the jetness of the product.

In the treatment of both types of materials, it is preferred to use continuous retorts, preferably vertical, and advantageously retorts of relatively small diameter or section, although the invention is not limited thereto. By the use of such retorts the quantity of bone through which the escaping vapors must pass before leaving the retort is relatively small so that the time interval during which the volatile matter is exposeed to high temperature after liberation from the bone is lessened, as compared with large retorts. Furthermore, the thermal gradient of such retorts is such that not only is adequate control of temperature throughout the charge attainable, but also the vaporized matter is not subjected to temperatures appreciably higher than those at which the vapor was formed or liberated, which may occur where the retort has a large section, in which event the outer regions of the charge may have to be heated hotter than desirable to insure that the center of the charge is heated adequately. These features of such retorts are beneficial because polymerization of volatile matter is minimized thereby.

In addition to the use of retorts of small section to minimize polymerization of and assist in removal of vaporized matter from the heating zone, we prefer to cause the vaporized matter to be removed substantially at the rate at which it is liberated. The manner in which this is accomplished may vary suitably according to whether bone or bone black is being treated, as will appear, but its attainment is assisted by the use of retorts of relatively small sectional area.

The heating of the material under conditions of temperature and removal of vaporized material such as characterize the invention is continued until the volatile content has been reduced below about 3 per cent. The exact amount of volatile content which remains in the product will depend in part upon the tinctorial properties desired although most suitably it is reduced to less than 2 per cent and it may with advantage be reduced virtually to zero, as will appear hereinafter.

The treatment of the two types of starting materials will now be considered in greater detail with reference to actual examples.

Treatment of bone black

Considering first the treatment of bone black to improve its tinctorial qualities, which constitutes a particularly important feature of the invention, bone blacks made by, for instance, methods existing at the time of this invention and having a volatile content in excess of 3, or more commonly 4, per cent are improved by treating them in accordance with the invention to reduce their volatile content to less than 3, and best less than 2, per cent. According to the invention, the bone black is heated under conditions to remove volatile content, as described hereinabove, the process being so conducted as to lower the volatile content of the bone black without ashing it appreciably because even slight ashing causes depreciation of jetness of the product.

We have found that in the treatment of previously produced bone black mere heating in a closed retort, i. e., in the absence of air, does not suffice to effect the reduction in volatile content which is an essential feature of this invention, and that just as in the treatment of bone as described hereinafter, steps must be taken to assist the liberation and removal of volatile matter. We have found further that in the treatment of this material the best results are to be had by providing the bone black with a carbonaceous material which is vaporizable but does not deposit carbon, by cracking or coking, at the temperatures to which it is exposed in the practice of the invention. In other words, we assist in removal of volatile content from bone black by providing it with carbonaceous materials which are substantially non-cracking and non-coking in the process, i. e., which do not add more than about 0.5 per cent of carbon to the black as a result of cracking. Such materials when vaporized appear to accelerate the removal of the volatile matter to an unexpected degree, so that in a relatively short heat treatment a bone black of greatly improved pigment grade is produced which is lower in volatile content than the original bone black and is, so far as we have been able to determine, indistinguishable in its tinctorial character from bone black made directly from raw bone as described hereinafter. It is believed that such agents function as a diluent of the volatile content of the bone black, as a carrier gas, and to provide a non-oxidizing atmosphere although it is not certain whether such agents actually displace or entrain the volatile content, or whether they act alone to provide a current of carrier gas, or perhaps operate in other ways, but it is the fact that they expedite reduction of the volatile content to an extent beyond that which would have been expected.

Various vaporizable carbonaceous materials of this class are available. We now prefer to use hydrocarbons of high boiling points, say having a final boiling point of at least about 425° C. For instance, diphenyl (B. P. 255° C.) does not suffice for this purpose, but para-diphenyl benzene (B. P. 427° C.) is fully satisfactory, as are mixtures of the isomeric diphenyl benzenes, which have high final boiling point. Various petroleum fractions are also suitable, and other vaporizable substances capable of assisting in the volatilization of volatile matter may be used. Hydrocarbons are desirable, however. The bone black is mixed with these vaporizable materials to coat or impregnate the granules so that vaporization of the vaporizable carbonaceous material occurs while the two are in contact. Less desirable results attend the separate vaporization of this material and then bringing the vapors into contact with the heated bone black, probably because evolution of vapor within the pores of the bone black is more effective in assisting reduction of the volatile content than mere exposure to a stream of non-oxidizing gas or vapor.

As an example of such substances, we have found that a highly naphthenic petroleum product having the following properties is satisfactory for the purposes of the invention:

| | |
|---|---|
| Gravity (A. P. I.) | 14.4 |
| Viscosity (210° F.) ___Saybolt seconds___ | 61.8 |
| Flash point | 365° F. |
| Fire point | 435° F. |
| Sulfur (by bomb method) | 0.41% |
| Carbon residue | 0.24% |
| Ash | 0.014% |

Example 1

As exemplifying the use of this material, 1 part by weight of it was heated in a retort with 9 parts by weight of ordinary commercial bone black which substantially passed 30-mesh and was retained on 50-mesh screens. The material was heated at a rate such that a temperature of 950° C. was reached in one hour and forty minutes. The original bone black had a carbon content of 8.05 per cent and a volatile content of 7.48 per cent. The product obtained in this treatment had a carbon content of 8.48 per cent and a volatile content of 1.18 per cent, and in both jetness and tinting strength it was far superior to the original material.

Another type of material which we have used satisfactorily is a fuel oil having the following properties:

| | |
|---|---|
| Gravity (A. P. I.) | 12.5 |
| Viscosity (210° F.) ____Saybolt seconds__ | 85.0 |
| Flash point | 200° F. |
| Sulfur | 0.90% |
| Carbon residue | 9.30% |
| Ash | 0.02% |

Example 2

The fuel oil just described was mixed with another portion of the bone black used in the preceding test, using the same proportions. The mixture was heated in a retort at a rate such that 950° C. was reached in two hours. The product had a carbon content of 9.3 per cent and a volatile content of 1.0 per cent; and it was markedly superior to the untreated bone black in both jetness and tinting strength.

When vaporizable carbonaceous materials are used as just described the rate of heating in stationary retorts is a factor of importance in controlling the composition and properties of the product. If the mixture is heated in such manner as to cause the impregnating agent to undergo cracking before it can escape from the retort, the carbon content of the bone black may be increased. However, this factor is less important in the case of rotary retorts, which may be heated three times as fast as stationary retorts.

If the carbon content of the bone black has been increased so much as to cause a decrease in jetness, as may happen, we have found that the jetness may be improved by treatment with oxidizing gases at elevated temperatures. For instance, this may be accomplished by heating the material with steam at, for example 800° to 1000° C., with carbon dioxide at 600° to 800° C., and air at 300 to 400° C.

*Example 3*

A petrolatum base wax from still residues obtained in the refining of petroleum, in general recovered in the solvent dewaxing of lubricating oil stocks, was mixed with ordinary bone black in the proportion of 12 parts of wax to 88 parts of bone black. The mixture was heated in a batch retort at such a rate that a temperature of 952° C. was reached in one hour and forty minutes after which the retort was allowed to cool to room temperature.

The product obtained by this procedure was much superior to the original bone black with respect to its pigment value, being very similar to that obtained by the procedure described in Example 1. The original bone black had a carbon content of 8.84 per cent and a volatile content of 6.49 per cent. The product had a carbon content of 9.57 per cent and a volatile content of 1.85 per cent.

*Example 4*

As further exemplifying the application of the invention to bone black, an ordinary commercial bone black having a carbon content of 8.05 per cent and a volatile content of 7.48 per cent was mixed at room temperature with the foregoing naphthenic petroleum fraction in the proportion of 9 parts by weight of the former to 1 part by weight of the latter. The mixture was fed from a hopper by a screw conveyor into a continuous rotary retort 8 inches in diameter and 9 feet in length which was mounted with its axis at an angle of 5° to the horizontal. Interiorly the retort was provided with a continuous spiral flight about 2½ inches wide welded to the retort wall. The retort was rotated at a speed such that the mixture of bone black and petroleum fraction traveled from the feed end to the discharge end along the spiral path formed by the flight in about twenty-five minutes. To minimize oxidation the finished product was discharged into a vertical cooler pipe provided with a bottom slide by means of which portions of the product could be withdrawn at intervals.

The retort was mounted in a heating chamber 5 feet in length extending from a point 22 inches below the feed end of the retort to a point 82 inches below the feed end. Three thermocouples were mounted in the heating chamber in a vertical plane substantially passing through the axis of the retort and with their junctions just clearing the retort. The upper (No. 1) of these was 3 inches from the wall at the upper end of the furnace, the second (No. 2) was at the center of the heated zone, and the third (No. 3) was 3 inches from the wall at the lower end of the furnace. The heating was so conducted that couples Nos. 2 and 3 indicated a temperature of substantially 982° C., and the No. 1 couple a temperature of substantially 760° C.

The product had a carbon content of 9.47 per cent and a volatile content of 1.81 per cent, and it was far superior in both jetness and tinting strength to the original bone black. In fact, on the Binney and Smith jetness scale it rated 1–A which is the highest rating for jetness.

In the practice of the invention as applied to the treatment of bone black it may be of advantage to compact or shape the mixture of bone black and vaporizable impregnating agent prior to the retorting operation, as by briquetting or extruding the mixture.

The size of the briquettes or extruded masses will depend in part on the grain size of the bone black, the rate of heating to be applied, and the nature and amount of impregnant. By way of example, if the bone black passes 30 and is retained on 50-mesh, and the impregnating agent is similar to those described in detail above, satisfactory results are to be obtained with about 10 to 25 per cent by weight of the impregnant and forming pressures of 2000 to 5000 pounds per square inch. A suitable briquette is from 1¼ to 2 inches in diameter and 1 to 2 inches high. There is nothing limiting in these sizes and pressures, however, because the improvement in the product which is due to such compacting appears to depend upon the reduction in specific surface which results from compacting of the small particles, and any procedure which effectively reduces the specific surface without interfering with the liberation and removal of volatile matter during retorting will suffice.

*Example 5*

The same materials in the same proportions used in Example 4 were mixed and heated in an oven at 125° C. to lower the viscosity of the oil and assist in impregnation of the bone black. The mixture was formed under a pressure of 5000 pounds per square inch into briquettes 1¼ inches in diameter and 1 inch high. The briquettes were heated in a batch retort at a rate such that a temperature of 950° C., was reached in two hours. The product had a carbon content of 8.9 per cent and a volatile content of 1.43 per cent, and was far superior in jetness and tinting strength to the original bone black.

*Treatment of bone*

Essentially, the treatment of bone is similar, i. e., heating to at least 950° C. under conditions to effect removal of volatile content. In the treatment of bone the use of vaporizable carbonaceous materials, as described above, is unnecessary as the vaporized matter (volatile content) may be removed substantially as rapidly as it is liberated by a slowly moving stream of suitable carrier gas, e. g., air. Such a stream of carrier gas may be drawn through the retort by the application of a partial vacuum to the vapor discharge line, air being drawn into the retort at the cooling end, where the bone black leaves the retort, suitably through means for controlling the amount of air admitted to avoid undue ashing of the black. Or, air may be forced in at the appropriate rate. Other modes of removal may, of course, be applied.

We have found also that where bone is used improvement in jetness of the bone black pigment produced is obtained by conducting the treatment under dehydrating conditions. Most suitably this is accomplished by treating the bone prior to carbonization with substances which act as dehydrating agents at the temperatures used in the carbonizing process. A variety of materials which become volatilized under the temperature conditions prevailing in the retort and act as dehydrating agents may be used. We prefer to use ammonium salts of non-volatile acids, most suitably ammonium sulfate, although ammonium phosphate and ammonium dichromate give good results. Calcium acetate and zinc chloride are examples of other agents that may be used for this purpose. It will be seen that these are, in general, salts which decompose at the temperatures involves with establishment of dehydrating conditions in the contents of the retort. Although it is preferred to coat or impregnate the bone with these agents, they or their decomposition products might be introduced into the retort during heating, as by means of the carrier air.

Although in the production of bone black pigment from bone the entire process may be conducted in a single operation, it is now preferred to perform it in two steps. In the first step the bone is heated to a maximum temperature of substanially 750° C., and thereafter it is heated in a second step to a maximum temperature of at least about 950° C. However, by producing the proper thermal gradient in a single tube retort the process may be carried out in a single, continuous operation, or, if desired, it may be performed in batch furnaces.

*Example 6*

As exemplifying this embodiment of the invention, cracked bone was sprayed with an aqueous solution of ammonium sulfate so that after drying the bone contained about 0.125 per cent by weight of the sulfate. It was then carbonized in a continuous vertical retort 2 inches in diameter and having a heated zone 8 inches in length maintained at a temperature of substantially 750° C. The retort was operated so that the bone traveled through the heating zone in one hour. Air at the rate of 1 cubic foot per hour was drawn through the retort from bottom to top by the application of a slight vacuum to the tar line, which issued horizontally from the retort at a point 2½ inches above the top of the heated zone. The char was then subjected to a second heat treatment in the same retort, the heating zone being kept at a temperature of substantially 950° C., the char flow being such that it traversed the heating zone in thirty minutes. During this second step air was drawn through the retort at the rate of half a cubic foot per hour.

The product obtained in this manner had a carbon content of 9.15 per cent and a volatile content of 1.79 per cent. It was greatly superior in jetness and tinting strength to bone black made from the same bone by the prior art procedures and containing in excess of 4 per cent of volatile content.

As stated hereinabove, the invention is predicated upon improvement in the properties of bone black for pigment use by reduction in the volatile content to less than 3, and most suitably less than 2, per cent, but the exact volatile content of the bone black will depend in part upon the particular jetness or tinting strength, or combination thereof, which is desired, and perhaps upon the carbon content. We have found, however, that the volatile content can desirably be reduced to a point where the product contains little, if any, volatile content.

As indicating the manner in which the volatile content and the carbon content can vary in the bone blacks provided by this invention, the following table representing materials which we have actually made in accordance with this invention may be referred to. For comparison there are listed a number of ordinary commercial bone blacks made in accordance with prior practice and representing characteristic ranges of volatile content of such blacks:

| Ordinary bone blacks | | Bone blacks made according to this invention | |
|---|---|---|---|
| Carbon content | Volatile content | Carbon content | Volatile content |
| 9.87 | 5.55 | 9.63 | 1.83 |
| 8.45 | 6.18 | 9.15 | 1.79 |
| 10.29 | 6.73 | 10.10 | 2.12 |
| 11.02 | 6.06 | 9.9 | 2.75 |
| 8.45 | 5.35 | 9.85 | 0.24 |
| 8.05 | 7.48 | 9.88 | 0.82 |
| | | 9.66 | 0.34 |
| | | 9.24 | 0.64 |
| | | 9.15 | 0.86 |

All of the bone blacks in this tabulation made according to this invention were of much superior value as pigments than were the ordinary bone blacks, prepared by prior art procedures, which are listed for comparison.

Various modifications from what has been described are of course possible and permissible. For instance, instead of briquetting bone black and vaporizable impregnating agent the mixture may be extruded to form a continuous shape which is fed to and maintained as such in its passage through the retort. Similarly, other variations which do not depart from the invention will occur to those working in the art.

This is a continuation in part of our copending application Serial No. 237,277, filed October 27, 1938.

According to the provisions of the patent statutes, we have explained the principle and method of practicing our invention and have described what we now consider to represent its best embodiment. However, we desire to have it understood that, within the scope of the appended claims, the invention may be practiced otherwise than as specifically described.

We claim:

1. That method of making bone black of pigment quality which comprises heating material of the group consisting of bone and bone black to a temperature of at least about 950° C. and removing volatile content liberated therefrom, and continuing such treatment until the volatile content of the bone black produced is not over about 3 per cent.

2. That method of making bone black of pigment quality which comprises heating material of the group consisting of bone and bone black to a temperature of at least 950° C., removing the volatile content substantially as rapidly as it is liberated, and continuing such treatment until the volatile content of the bone black produced is not over about 2 per cent.

3. That method of making bone black which comprises heating material of the group consisting of bone and bone black to at least about 950° C. to drive off volatile content therefrom, removing by carrier gas flow the volatile content substantially as rapidly as it is liberated and without substantial superheating thereof, and continuing such treatment until the volatile content of the bone black produced is not over about 2 per cent.

4. That method of making bone black of pigment quality which comprises the steps of heating bone to a temperature to carbonize it, then heating to at least about 950° C. to expel volatile matter, and continuously removing the volatile matter as it is liberated until the volatile content of the bone black produced is not over about 2 per cent.

5. That method of making bone black of pigment quality which comprises the steps of heating bone to a temperature to carbonize it, then heating to at least about 950° C. to expel volatile matter, and removing said volatile matter by a stream of carrier gas substantially as rapidly as it is liberated until the volatile content of the bone black produced is not over about 3 per cent.

6. A method according to claim 5, said carrier gas being air in an amount insufficient to cause substantial oxidation, and said volatile content being reduced below about 2 per cent.

7. That method of making bone black of pigment quality which comprises the steps of heating bone to carbonize it, then heating to at least about 950° C. and expelling volatile matter, providing dehydrating conditions in the heating zone, and removing said volatile matter as it is liberated until the volatile content of the bone black produced is not over about 3 per cent.

8. That method of making bone black of pigment quality which comprises the steps of heating a mixture of bone and a volatilizable substance capable of establishing dehydrating conditions to a temperature to carbonize the bone, then heating to at least about 950° C. to expel volatile matter therefrom, removing said volatile matter substantially as rapidly as it is liberated in a stream of carrier gas and without subjecting it to a temperature substantially greater than that at which it is liberated, and continuing such treatment until the volatile content of the bone black produced is not over about 2 per cent.

9. That method of reducing the volatile content and improving the tinctorial value of a bone black which comprises heating said bone black mixed with a vaporizable carbonaceous material to at least about 950° C. without substantial cracking or coking of said carbonaceous material, removing vaporized material as it is liberated, and continuing such treatment until the volatile content of the bone black is not over about 3 per cent.

10. A method according to claim 9, said carbonaceous material having a final boiling point of at least about 425° C., and said volatile content being reduced to not over about 2 per cent.

11. A method according to claim 9, said carbonaceous material being a high boiling petroleum fraction.

12. That method of reducing the volatile content and improving the tinctorial value of a bone black which comprises heating said bone black together with high boiling vaporizable carbonaceous material to a temperature of at least about 950° C., removing vaporized material substantially as rapidly as it is liberated and without substantial superheating thereof, and continuing such treatment to reduce the volatile content of the bone black to not over about 2 per cent while leaving the carbon content substantially unchanged.

13. That method of reducing the volatile content and improving the tinctorial value of a bone black which comprises heating said bone black to a temperature of at least about 950° C. in contact with a hydrocarbon having a boiling point of at least about 425° C., removing vaporized material as it is liberated, and continuing such treatment to reduce the volatile content of the bone black to not over about 2 per cent.

14. As a new article of manufacture, pigment bone black having a volatile content of not over about 3 per cent, and characterized by combining high jetness and tinting strength.

15. As a new article of manufacture, pigment bone black having a volatile content of not over about 2 per cent, and characterized by combining high jetness and tinting strength.

16. As a new article of manufacture, pigment bone black having a volatile content of not over about 3 per cent, and a carbon content of from about 8 to 10.5 per cent, and characterized by combining high jetness and tinting strength.

17. That method of reducing the volatile content and improving the tinctorial value of a bone black which comprises heating said bone black together with a vaporizable carbonaceous material to at least about 950° C. to cause volatile matter to be driven from the bone black, removing vaporized material as it is liberated, and continuing such treatment until the volatile content of the bone black is not over about 2 per cent.

ELLIOTT P. BARRETT.
GEORGE D. BEAL.